July 6, 1965
O. RUDQVIST ETAL
3,193,057
METHOD FOR BRAKING ROTATING MACHINES AND
ARRANGEMENT FOR PERFORMING THE METHOD
Filed June 25, 1962
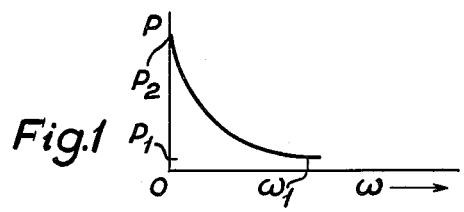
Fig.1
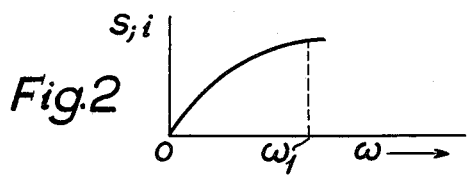
Fig.2
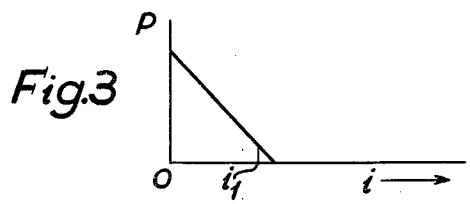
Fig.3
Fig.4
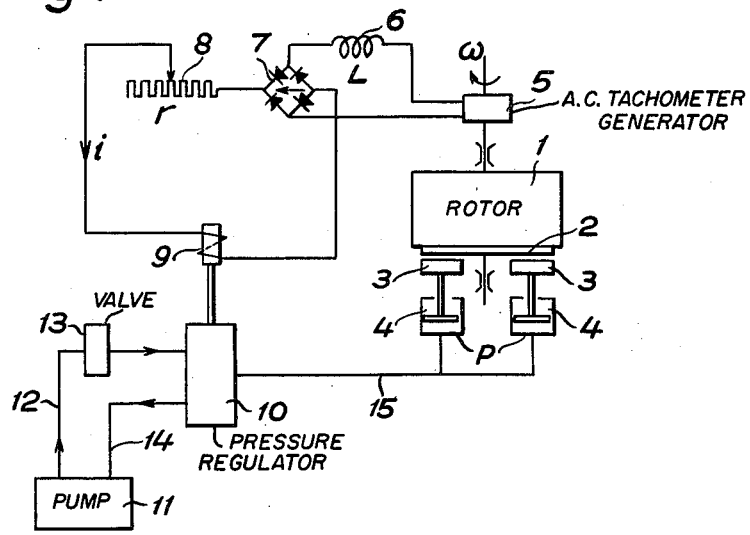
INVENTORS
Olle Rudqvist
Henning Schiøtt
BY
Bailey, Stephens & Huettig
ATTORNEYS United States Patent Office 3,193,057
Patented July 6, 1965

3,193,057
METHOD FOR BRAKING ROTATING MACHINES AND ARRANGEMENT FOR PERFORMING THE METHOD
Olle Rudqvist, Vasteras, and Henning Schiott, Skultuna, Sweden, assignors to Allmanna Svenska Elektriska Aktiebolaget, Vasteras, Sweden, a Swedish corporation
Filed June 25, 1962, Ser. No. 204,945
Claims priority, application Sweden, June 30, 1961, 6,821/61
3 Claims. (Cl. 188—180)

The present invention relates to a method for braking rotating machines, for example the rotors in large electrical generators, and an arrangement for performing the method, advantageous due to its simplicity and reliability.

Large generators driven by water turbines are usually equipped with brakes by means of which the rotors of the generators may be rapidly stopped. Brakes for this purpose usually consist of brake blocks which may be pressed against a braking surface on the rotor with a constant pressure. The moment at which the brakes may be applied is dependent upon this pressure. If for instance the pressure is so calculated and set that the brakes can be applied at full generator speed, the braking action in the lower speed register will be very poor, meaning that the capacity of the brakes is not by far fully utilized. The braking pressure is therefore usually so set that full braking effect is obtained over the greater part of the lower half of the speed range, but this means that the braking effect in the higher half of the speed range is so great that the brakes would be destroyed by heat if they were applied before the speed has been reduced by air friction and bearing friction to about 50% of full speed. It is possible to make the brake blocks large and possibly arrange cooling of these so that they would be able to take up a large braking effect in the higher speed range, but this is not a favorable solution of the problem since the braking device would thus be extremely large.

It is thus desired to be able to stop certain rotating machines very rapidly without having to make the braking arrangements large and space demanding. As already mentioned, the present invention relates to a method for braking rotating machines, which method makes it possible to reduce the braking time to approximately half the time taken when the known braking arrangements are used. The method according to the invention for braking rotating machines, for example the rotors in large geneartors, is characterised in that one or several brake blocks are pressed against a braking surface rotating with the machine, in such a way that the product of the speed and the braking pressure on the brake blocks is essentially constant for the greater part of the braking action.

By maintaining the product of the speed and the braking pressure on the brake blocks constant for the greater part of the braking action, braking will take place with constant effect so that, with reference to the heat capacity, the braking device is utilized almost to the full. Compared to braking with constant braking moment, i.e. during the whole retardation time a constant braking pressure, the braking time is reduced to half.

According to a further development of the invention, at the start of a braking action, the brake blocks may be applied with a greater pressure than that corresponding to the product essentially constant for the greater part of the braking action, thus obtaining an even more rapid braking. After a predetermined time interval, corresponding to the time from the brakes being applied with such greater pressure until the braking arrangement has reached full working temperature, the pressure on the brake blocks is reduced to that corresponding at the prevailing speed to the constant product of the speed and braking pressure. This action can easily be obtained by means of a regulator incorporating a timing device. After the braking arrangement has reached working temperature, the pressure on the brake blocks is reduced to that corresponding at the prevailing speed to the constant product of the speed and braking pressure.

One advantageous arrangement for performing the method consists of a first device which generates a control magnitude S dependent upon the angle speed, $$S = \frac{k\omega}{a + bj\omega}$$

where $k$, $a$ and $b$ are constants and $j = \sqrt{-1}$, which control magnitude is transmitted to a second device which regulates the pressure P on the brake blocks in such a way that $P = c - dS$, where $c$ and $d$ are constants, so that the braking pressure P decreases linearly from the value $c$ towards 0 with increasing control magnitude S.

With the help of these two devices and suitably chosen constants $a$, $b$, $c$, $d$ and $k$ it may be obtained that the braking pressure on the brake blocks multiplied by the angular speed will be almost constant, which means that the braking effect is maintained almost constant. Devices to function in the manner indicated may be made very simple and cheap in construction.

The invention will be described in the following with reference to the accompanying drawing where FIGURE 1 shows the relation between the braking pressure and the speed which is desired according to the invention, FIGURES 2 and 3 the method of operation of the two arrangements which together can give a braking according to the method, and FIGURE 4 shows in detail a braking arrangement which is very advantageous.

In FIGURE 1 $\omega_1$ is the normal speed of the machine, and when the machine is to be stopped, the brakes operate at this speed in accordance with the method according to the invention. The desired braking pressure is thus $P_1$, and if the braking pressure is increased towards $P_2$ when the speed $\omega$ is reduced in accordance with the curve in FIGURE 1, the braking effect will the whole time be maintained essentially constant, whereby the rotating parts of the machine are braked in the shortest possible time. An arrangement for performing the method may advantageously consist of a first arrangement which operates according to FIGURE 2, which arrangement controls a second arrangement operating according to FIGURE 3, whereby the desired relation between the braking pressure P and the speed $\omega$ is obtained. The curve in FIGURE 2 represents a control magnitude S generated by the first arrangement, which control magnitude may be indicated by the following expression:

$$S = \frac{k\omega}{a + bj\omega}$$

where $k$, $a$ and $b$ are constants. If this control magnitude S is supplied to a second arrangement which regulates the pressure P on the brake blocks in such a way that $P = c - dS$, where $c$ and $d$ are constants, in other words so that the braking pressure P is reduced linearly in relation to the desired value of S, by suitable adjustment a practical approximation to the relation aimed at can be obtained, i.e. that the product of the braking pressure P and the speed $\omega$ should be essentially constant.

An extremely simple arrangement with the above mentioned properties is shown in FIGURE 4. The figure shows a rotor 1 with a braking surface 2, and 3 are brake blocks which by means of pressure cylinders 4 may be pressed against the braking surface 2. To the generator is connected an A.C. tachometer-generator 5 which runs with the same angular speed $\omega$ as the rotor 1. To the output terminals of the tachometer-generator is connected an inductance 6(L) and in series with this a variable resistance $8(r)$, whereby a control magnitude is obtained $$S = i = k\frac{\omega}{r + jL\omega}$$

This control magnitude which consists of a current $i$ is arranged to flow through a winding 9 on the electrohydraulic or electropneumatic pressure regulator 10. If this regulator is intended for D.C. control, a rectifier 7 may be arranged in the circuit as shown, the object of which is to rectify the current $i$ flowing through the inductance 6, resistance 8 and winding 9. The pressure regulator 10 is supplied with a pressure medium, for example oil under pressure, from the pump 11 through the conduit 12. In this conduit 12 a closing valve 13 is arranged by which the braking arrangement can be put out of operation. The electrohydraulic regulator 10 is arranged to give a linear relationship between the current $i$ and the pressure P in the pressure cylinders in such a way that P decreases linearly when $i$ increases. Excess oil flows through the conduit 14 back to the pump 11 while the oil which puts the pistons in the pressure cylinders 4 under pressure is led to these through the conduit 15.

The arrangement shown in the figures is only one example of an arrangement according to the invention and many other embodiments are possible within its scope. The shown example is thus not limiting.

We claim:

1. In braking apparatus for braking a rotating body, having a braking surface thereon, a brake block and means for pressing the brake block against the braking surface of the rotating body, a speed measuring means connected to the rotating body, and means connected to said speed measuring means and to the brake block for regulating the braking pressure on the brake block to keep the product of the speed and the braking pressure essentially constant for the greater part of the braking period, said brake block means constituting the sole means for braking said body.

2. In braking apparatus for braking a rotating body having a braking surface thereon, a brake block and means for pressing the brake block against the braking surface on the rotating body, a speed measuring means connected to the rotating body, and means connected to said speed measuring means and to the brake block for regulating the braking pressure on the brake block to keep the product of the speed and the braking pressure esesntially constant for the greater part of the braking period, but greater at the start of the braking action than said constant product, said brake block means constituting the sole means for braking said body.

3. In a device as claimed in claim 1, said speed measuring means comprising an A.C. tachometer generator rigidly connected to the rotating body, said regulating means including means for decreasing the braking pressure P linearly with increasing control current $i$, and means connecting the output voltage of said tachometer generator to a resistance in series with an inductance to generate a control current $$i = k\frac{\omega}{r + jL\omega}$$

where $\omega$ is the speed of rotating body, $r$ is the resistance, $L$ is the inductance, $k$ is a constant, and $j = \sqrt{-1}$, and means for transmitting said control current to said regulating means.

References Cited by the Examiner

UNITED STATES PATENTS

| 1,091,738 | 3/14 | Dunlop | 188—182 |
| 1,119,282 | 12/14 | Hoffman | 188—182 |
| 1,850,609 | 3/32 | Thomas | 303—3 |

FOREIGN PATENTS 461,906    2/37    Great Britain.

ARTHUR L. LA POINT, *Primary Examiner.*

EUGENE G. BOTZ, *Examiner.*